(12) United States Patent
Gross

(10) Patent No.: US 6,240,882 B1
(45) Date of Patent: Jun. 5, 2001

(54) PROTECTIVE GARMENT FOR PETS

(76) Inventor: Schon A. Gross, 2104 Thomas View Rd., Reston, VA (US) 20191-4802

( * ) Notice: Subject to any disclaimer, the term of this patent is extended or adjusted under 35 U.S.C. 154(b) by 0 days.

(21) Appl. No.: 09/400,545

(22) Filed: Sep. 21, 1999

(51) Int. Cl.$^7$ ................ A01K 29/00; A61D 9/00
(52) U.S. Cl. ................ 119/850; 36/111; 36/2 R
(58) Field of Search ............ 119/850; D30/145; 2/24; 36/111, 2 R, 136, 2.6; 607/108

(56) References Cited

U.S. PATENT DOCUMENTS

| | | |
|---|---|---|
| 3,791,383 | 2/1974 | Friedman . |
| 4,479,457 | 10/1984 | Rotolo . |
| 4,586,506 * | 5/1986 | Nangle ................ 607/112 |
| 4,688,572 * | 8/1987 | Hubbard et al. ............ 607/112 |
| 5,020,711 * | 6/1991 | Kelley ................ 224/222 |
| 5,033,124 * | 7/1991 | Bucalo et al. ............ 2/227 |
| 5,075,043 | 12/1991 | Butler . |
| 5,137,508 * | 8/1992 | Engman ................ 602/79 |
| 5,152,285 | 10/1992 | Gnegy . |
| 5,302,806 | 4/1994 | Simmons et al. . |
| 5,341,765 | 8/1994 | McComb . |
| 5,357,693 * | 10/1994 | Owens ................ 36/71 |
| 5,463,985 * | 11/1995 | Shover ................ 119/850 |
| 5,466,251 | 11/1995 | Brunson et al. . |
| 5,484,366 | 1/1996 | Wilkinson . |
| 5,496,358 | 3/1996 | Rosenwald . |
| 5,676,094 | 10/1997 | Gun-Munro . |
| 5,676,095 * | 10/1997 | Ralls ................ 119/850 |
| 5,823,984 | 10/1998 | Silverberg . |

* cited by examiner

Primary Examiner—Charles T. Jordan
Assistant Examiner—Yvonne R. Abbott
(74) Attorney, Agent, or Firm—Hoffman Wasson & Gitler PC

(57) ABSTRACT

The therapeutic device of the invention is a pair of sleeves which are worn on the animal's legs. The sleeves have a strap which extends upwardly and across the animal's back and are releasably connected to one another. The sleeves have an inner half and outer half. The inner half is provided with a section of padding which corresponds to the area that will cover the animal's elbows. The outside half of the sleeve has a pocket. This pocket is used to receive padding, a hot pack or a cold pack, depending upon the particular needs of the animal. The padding can be used for protection against bumps, whereas the hot and cold pack can be used to apply hot or cold to a joint to accelerate healing.

15 Claims, 1 Drawing Sheet

PROTECTIVE GARMENT FOR PETS

FIELD OF THE INVENTION

The invention is a therapeutic garment, more particularly for pets.

BACKGROUND OF THE INVENTION

Animals often become injured or undergo medical procedures that require some time to completely heal. Often, the recovering animal slows the healing process, or in some cases, does further damage, because they do not take the precautions necessary to prevent further irritation to the healing area. Because they cannot be instantaneously trained to not engage in activities that may cause harm to an injured and recovering area, it is necessary to provide garments that will protect the area and even accelerate the healing process.

The prior art discloses protective and therapeutic devices for animals. One such device is shown in U.S. Pat. No. 5,076,043 (Butler). This device has two sleeves that envelope the animal's legs. A pair of straps is provided to connect the straps together and secure them to the animal. The sleeves are made of a leg section having an internal and external fabric layer with a padding material placed therebetween. The upper shoulder portion is unpadded.

A similar device is disclosed in U.S. Pat. No. 5,341,765 to McComb. The device is a protective garment formed a single piece of material that forms a strap extending across the animal's back and has ends formed into sleeves for surrounding the animal's legs. The garment is made from double layered fabric. The cushioning qualities of the fabric are relied upon to provide protection for the animal.

U.S. Pat. No. 4,479,457, issued to Rotolo discloses a protective elbow pad for dogs. The pads are made from an outer layer of durable fabric, a foam central layer, and an inside layer of soft felt-like material. The elbow pad is adjustable in size and surrounds the immediate elbow area. None of the prior art devices disclose a protective device for animals having a pocket that can receive padding or a hot or cold pack.

It is an object of the invention to provide a pet protective garment having a pocket that receives padding or a hot or cold pack.

It is another object of the invention to provide a protective garment for an animal that protects the animal's joints and aids in healing.

It is a further object of the invention to provide a protective garment that has an area of padding and an area of hot or cold.

It is an object of the invention to provide a pet therapeutic garment that is easy to put on an animal.

It is a further object of the invention to provide a pet protective garment that is inexpensive and easy to manufacture and easy to clean.

It is still another object of the invention to provide a protective garment that protects both of an animal's legs and loosely connects one another.

These and other objects of the invention will become apparent after reading the description of the invention which follows.

SUMMARY OF THE INVENTION

The therapeutic device of the invention is a pair of sleeves which are worn on the animal's legs. The sleeves have a strap which extends upwardly and across the animal's back and are releasably connected to one another. The sleeve have an inner half and outer half. The inner half is provided with a section of padding which corresponds to the area that will cover the animal's elbows. The outside half of the sleeve has a pocket. This pocket is used to receive padding, a hot pack or a cold pack, depending upon the particular needs of the animal. The padding can be used for protection against bumps, whereas the hot and cold pack can be used to apply hot or cold to a joint to accelerate healing.

The sleeves are applied to the animal's legs and can be connected to one another by such means as hook and loop fasteners. Once in place, the protective garments provide enough protection to prevent the animal from further injury that otherwise result from normal activity. The flexibility of a pocket that can receive padding or hot or cold pack allows the protective garments to be used in a wide variety of situations and tailored to the particular problem afflicting the animal.

BRIEF DESCRIPTION OF THE DRAWINGS

The invention will be fully described with reference to the drawings.

DETAILED DESCRIPTION OF THE DRAWINGS

Figure 1:
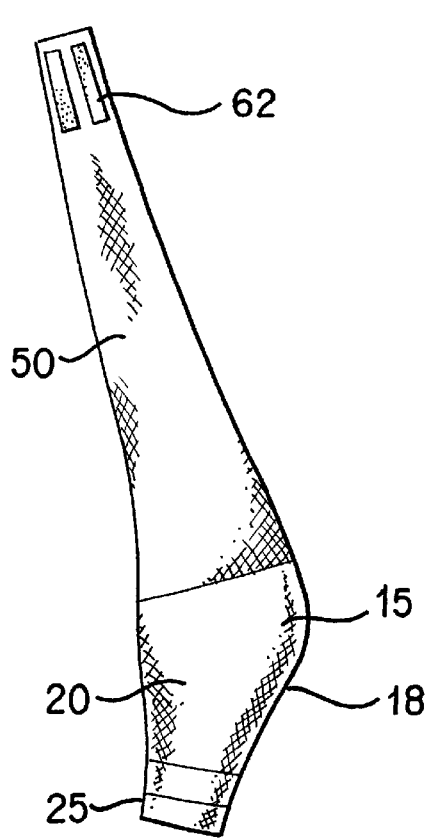
FIG. 1 shows the outside half of the sleeve.

The outside half of the protective garment can be seen in FIG. 1. This sleeve would be put on the animal's left leg. The outside garment has a sleeve portion 15 that is provided with a pocket 20. The bottom portion of the pocket is provided with a cuff 25 made of elastic material to provide a secure, but comfortable fit about the animal's legs. The rear edge 18 of the sleeve is curved to better fit the contours of the animal's elbow. The pocket extends along the entire outer half of the sleeve. The pocket is closeable with a fastener, preferably hook and loop fasteners. The sleeve is initially provided with padding. The padding can be taken out for ease of washing. Also, it can be replaced with an ice pack or heat pack, if the malady of the animal requires such treatment. The hot or cold pack can be replaced after its useful life. Extending from the top edge of the sleeve is a strap 50. The strap is configured to extend up the side and across the back of an animal. At the top of the strap a releasable fastener 62 is provided. The releasable fastener allows the two sleeves to be connected to one another.

Figure 2:
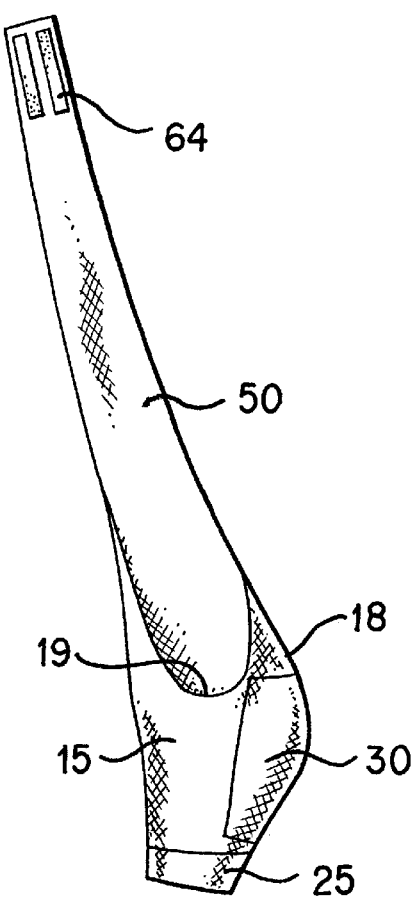
FIG. 2 shows the inside half of the sleeve.

The second in a pair of sleeves is shown in FIG. 2. This Figure shows the inner half of the protective garment and would be placed on an animal's right leg. Towards the rear edge, a pad 30 is sown to the sleeve. The strap 50 extending upwardly a mating fastener 64. The two straps 50 extend upwardly from their respective sleeve and are connected to one another with the mating fasteners 62, 64. Although the preferred type of fastener is a hook and loop fastener, any suitable means for connecting the two straps together may be used. The top edge 19 of the inner half is arcuate which allows the sleeve to better conform to the upper leg.

Figure 3:
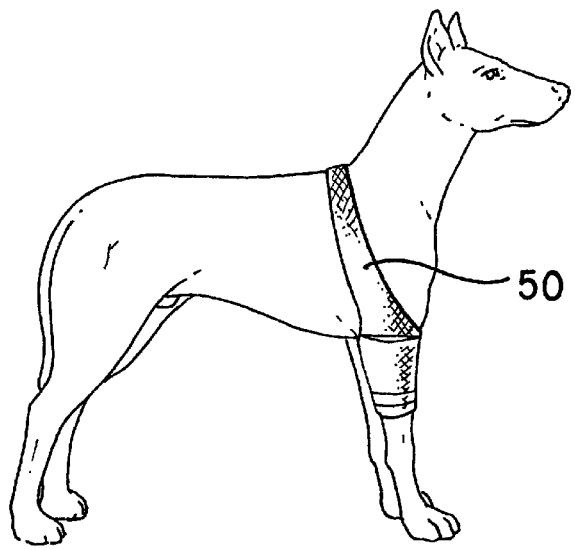
FIG. 3 shows the device as being used by an animal.

The device is shown in use in FIG. 3. As can be seen, the sleeve covers the elbow portion of the front leg of a dog. In this position, the padding, either in the form of the permanent padding 30 or in the pocket 20 is in position to protect the animal's elbows. Also, in this position, a hot or cold pack will be directed on the joint. The strap 50 can be seen as it extends upwardly over the back of the animal for connection to another strap attached to the opposite leg.

The protective garments can be made in a variety of sizes. The diameter of the sleeves and the lengths of the straps can be varied so that sleeves for any size animal will be available. The protective garment allows padding and heat or cold therapy to be conveniently and easily available to animals. The garment, both protects against further injury and also accelerates the healing process. Also, any type of mating fasteners such as a button and hole or snaps can be used in place of the hook and loop fasteners used to attach the straps to one another and close the pocket. Also, a cuff can be used at the top of the sleeve. The two cuffs would retain the sleeve in position and obviate the need for a strap. This would allow a single sleeve to be used, if desired.

While the preferred embodiment of the invention has been disclosed, the disclosure is not intended to be limiting in any manner. The invention is defined by the claims which follow.

What is claimed is:

1. A protective garment for pets, comprising
   at least one sleeve having a height, said sleeve having an inner half and an outer half;
   a first section of padding on said sleeve inner half said section having a height smaller than said height of said sleeve; and
   a pocket on said sleeve outer half.

2. The protective garment of claim 1, further comprising padding in said pocket.

3. The protective garment of claim 1, further comprising an ice pack in said pocket.

4. The protective garment of claim 1, further comprising a hot pack in said pocket.

5. The protective garment of claim 1, further comprising a strap extending from said at least one sleeve outer half to a second outer half of a second sleeve.

6. The protective garment of claim 1, further comprising an elastic cuff at the bottom of the sleeve.

7. The protective garment of claim 1, wherein said pocket is formed on an unpadded portion of said sleeve.

8. A protective garment for pets, comprising
   a pair of sleeves,
      each sleeve comprising an inner half and outer half, said sleeve having a height and inner and outer halves;
      a first section of padding on one of said sleeves, said section having a height smaller than said height of one of said sleeves;
      a pocket on said one sleeve;
      a strap extending from said one sleeve outer half to the other sleeve; and
      said straps having mating connectors.

9. The protective garment of claim 8, further comprising padding in said pocket.

10. The protective garment of claim 8, further comprising an ice pack in said pocket.

11. The protective garment of claim 8, further comprising a hot pack in said pocket.

12. The protective garment of claim 8, further comprising an elastic cuff at the bottom of the sleeve.

13. The protective garment of claim 7, wherein said pocket is formed on an unpadded portion of said sleeve.

14. A protective garment for pets, comprising:
    at least one sleeve having an inner and outer surface, said sleeve having an inner half and an outer half;
    a first section of padding on said sleeve inner half;
    a pocket on said sleeve outer half; and
    said pocket on an unpadded section of said sleeve.

15. The protective garment of claim 14, further comprising padding placed in said pocket.

* * * * *